US012115777B2

(12) United States Patent
Escudero Gonzalez et al.

(10) Patent No.: US 12,115,777 B2
(45) Date of Patent: *Oct. 15, 2024

(54) PRINTER VACUUM CONVEYOR WITH ADJUSTABLE ACTIVE AREA

(71) Applicant: ELECTRONICS FOR IMAGING, INC., Fremont, CA (US)

(72) Inventors: Juan Escudero Gonzalez, Almazora (ES); Eduardo Bueno Espinal, Almazora (ES)

(73) Assignee: ELECTRONICS FOR IMAGING, INC., Londonderry, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/812,944

(22) Filed: Jul. 15, 2022

(65) Prior Publication Data

US 2022/0348028 A1 Nov. 3, 2022

Related U.S. Application Data

(63) Continuation of application No. 16/738,789, filed on Jan. 9, 2020, now Pat. No. 11,407,238.

(51) Int. Cl.
*B41J 11/00* (2006.01)
*B65H 5/22* (2006.01)

(52) U.S. Cl.
CPC .......... *B41J 11/0085* (2013.01); *B41J 11/003* (2013.01); *B41J 11/007* (2013.01); (Continued)

(58) Field of Classification Search
CPC ............ B65H 5/224; B65H 2406/3221; B65H 2406/3622; B65H 2406/3632; (Continued)

(56) References Cited

U.S. PATENT DOCUMENTS 3,592,334 A 7/1971 Fleischauer
4,411,420 A * 10/1983 Louis ................ B65G 21/2036 271/197
(Continued)

FOREIGN PATENT DOCUMENTS

CN 2352780 Y 12/1999
CN 107883009 A 4/2018
(Continued)

*Primary Examiner* — Luis A Gonzalez
(74) *Attorney, Agent, or Firm* — Perkins Coie LLP

(57) ABSTRACT

A printing system includes a driving belt configured to drive media through the printing system relative to one or more print heads and a vacuum conveyor system. The vacuum conveyor system includes a vacuum chamber cover having a first surface and a second surface opposite the first surface, as well as a plurality of slots through the cover that form openings from the first surface to the second surface. A seal, disposed within and extending along at least a portion of a length of a respective slot, is drivable to open or close the respective slot. A vacuum chamber below the second surface of the vacuum chamber cover is configured to apply a vacuum to the media through the plurality of slots. The applied vacuum constrains the media on the driving belt by flattening it against the driving belt.

17 Claims, 4 Drawing Sheets

(52) U.S. Cl.
CPC ..... *B65H 5/224* (2013.01); *B65H 2406/3221* (2013.01); *B65H 2406/3622* (2013.01); *B65H 2406/3632* (2013.01); *B65H 2801/03* (2013.01)

(58) Field of Classification Search
CPC ............. B65H 2406/362; B41J 11/0085; B41J 11/003; B41J 11/007
See application file for complete search history.

(56) References Cited

U.S. PATENT DOCUMENTS

| | | | | |
|---|---|---|---|---|
| 5,779,236 | A | 7/1998 | Duncan et al. | |
| 6,254,090 | B1 | 7/2001 | Rhodes et al. | |
| 6,254,092 | B1 | 7/2001 | Yraceburu et al. | |
| 6,270,074 | B1 | 8/2001 | Rasmussen et al. | |
| 6,371,430 | B1 | 4/2002 | Vernackt | |
| 6,443,443 | B1 | 9/2002 | Hirth et al. | |
| 6,571,702 | B2 | 6/2003 | Wotton et al. | |
| 6,672,720 | B2 * | 1/2004 | Smith | B41J 11/007 347/101 |
| 6,927,841 | B2 | 8/2005 | Hinojosa et al. | |
| 7,980,558 | B2 * | 7/2011 | Moore | B41J 11/06 198/803.5 |
| 8,308,287 | B2 * | 11/2012 | Ebihara | B41J 2/155 347/108 |
| 9,815,303 | B1 | 11/2017 | Herrmann et al. | |
| 2002/0062750 | A1 | 5/2002 | Wotton et al. | |
| 2002/0067403 | A1 | 6/2002 | Smith | |
| 2002/0110400 | A1 | 8/2002 | Beehler et al. | |
| 2005/0156376 | A1 | 7/2005 | Kondratuk et al. | |
| 2006/0043666 | A1 | 3/2006 | Piccinino | |
| 2009/0039595 | A1 | 2/2009 | Yoda et al. | |
| 2010/0276879 | A1 | 11/2010 | Bober | |
| 2017/0057255 | A1 | 3/2017 | Byrne | |
| 2018/0170073 | A1 | 6/2018 | Barberan Latorre | |
| 2021/0213759 | A1 | 7/2021 | Escudero Gonzalez et al. | |

FOREIGN PATENT DOCUMENTS

| | | | |
|---|---|---|---|
| DE | 102014104666 | A1 | 10/2015 |
| DE | 102016201240 | A1 | 9/2016 |
| EP | 3118008 | A1 | 1/2017 |
| ES | 2310490 | B1 | 11/2009 |
| JP | H061467 | B2 | 1/1994 |
| WO | 2018074987 | A1 | 4/2018 |
| WO | 2021004876 | A1 | 1/2021 |

* cited by examiner

PRINTER VACUUM CONVEYOR WITH ADJUSTABLE ACTIVE AREA

CROSS-REFERENCE TO RELATED APPLICATION(S)

This application is a continuation of U.S. patent application Ser. No. 16/738,789, filed on Jan. 9, 2020, titled "Printer Vacuum Conveyor With Adjustable Active Area", which is incorporated herein by reference in its entirety.

TECHNICAL FIELD

This disclosure relates to a vacuum conveyor for printing systems that has an adjustable active area.

BACKGROUND

Vacuum conveyor systems for inkjet printing applications flatten, secure, and convey substrates to ensure images are printed correctly on the substrates. Inkjet printing applications in particular are more sensitive to the flatness of the substrate than other printing techniques because ink is deposited without contact between the ink deposition system and the substrate. These conveyor systems typically have a perforated belt over a vacuum table with openings that allow it to apply adhesion forces between the substrate and the belt.

In certain conditions, the substrate may not cover the entire width and length of the vacuum table area. For example, a system may need to accommodate substrates with varying width, length and spacing distances between them, and with varying number of substrates loaded into the system. The openings that are not covered—referred to herein as a leakage area of the vacuum conveyor system—cause inefficient usage of the fan power that is used to create the vacuum. The vacuum source may also be unable to maintain the vacuum pressure at a sufficiently high level, reducing substrate flattening performance. To improve performance of the vacuum conveyor systems, it is desirable to limit the leakage area. However, designing a conveyor system that performs efficiently in variable working conditions can be challenging due to the associated complexity and cost.

DETAILED DESCRIPTION

Figure 1:
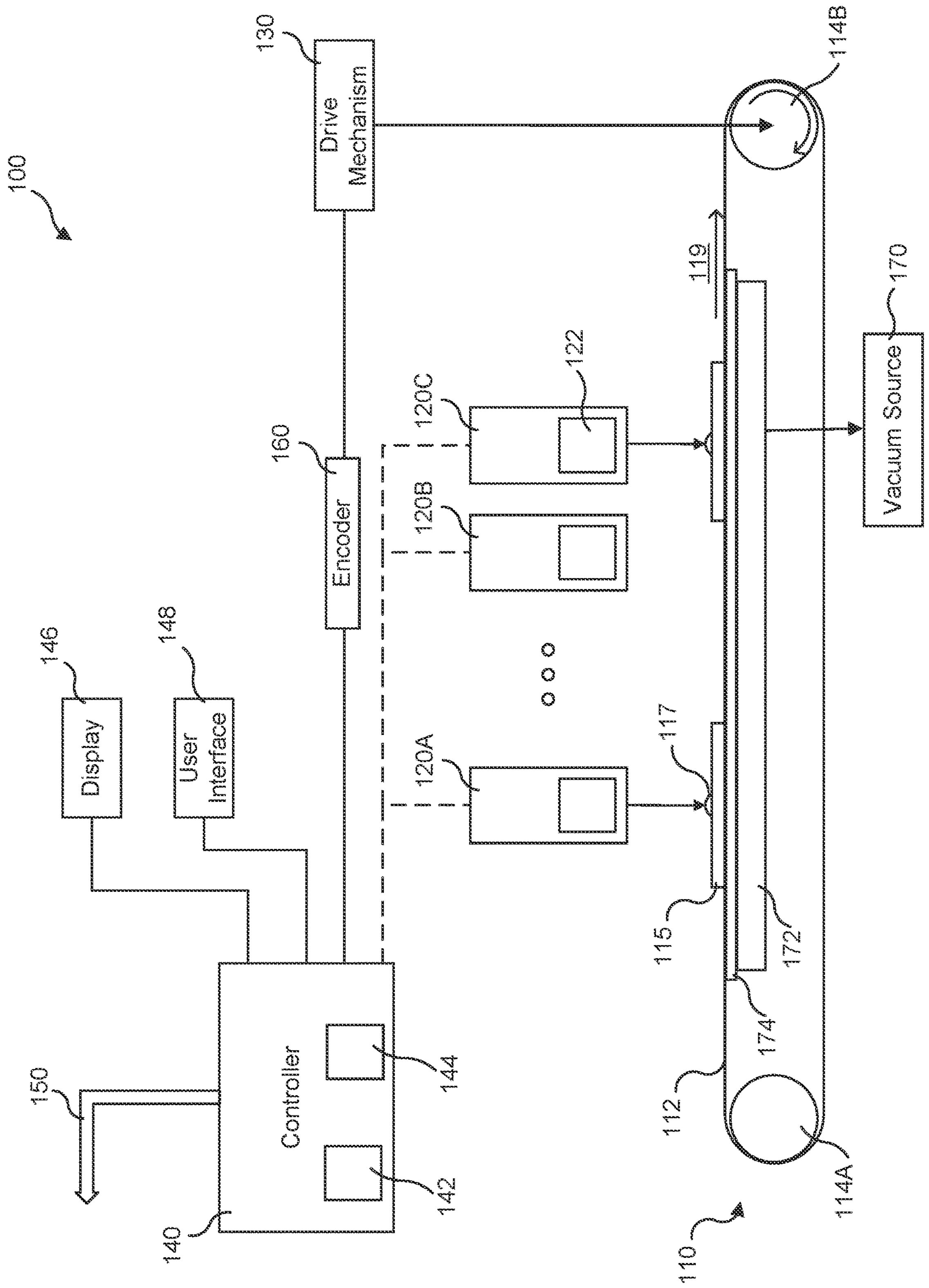
FIG. 1 is a block diagram illustrating components of an example printing system.

References in this description to "an embodiment," "one embodiment," or the like, mean that the particular feature, function, structure, or characteristic being described is included in at least one embodiment of the present disclosure. Occurrences of such phrases in this specification do not necessarily all refer to the same embodiment. On the other hand, the embodiments referred to are also not necessarily mutually exclusive.

Described herein are embodiments of a printing system that applies vacuum to flatten media for printing. The printing system includes actuators that can close or open openings in a vacuum chamber cover to limit an area over which the vacuum is applied. The ability to control the active vacuum area is particularly beneficial under variable working conditions of the printing system, where substrates of different widths and lengths may be loaded into the printer with possibly varying distances between the working pieces of media. Since these different-sized pieces and different spacing cause varying degrees of coverage of the vacuum table, the vacuum conveyor system is more efficient if the system can dynamically adjust the area of the vacuum table over which vacuum is applied.

In some embodiments, the printing system with adjustable vacuum application area includes one or more print heads, a driving belt configured to drive media through the printing system relative to the print heads, and a vacuum conveyor system. The vacuum conveyor system can include a vacuum chamber cover having a first surface and a second surface opposite the first surface. The vacuum chamber cover can have a plurality of openings through the cover from the first surface to the second surface that are repeated along the longitudinal direction of the vacuum chamber cover. A seal can be disposed substantially below each of the regions with openings. Each seal extends along the length of the vacuum chamber cover and is drivable by an actuator to open or close the openings. A vacuum chamber below the second surface of the vacuum chamber cover is configured to apply vacuum to the lower surface of the media through one or more of the openings that are open. The applied vacuum constrains the media on the driving belt by flattening the media against the driving belt.

The vacuum conveyor system described herein therefore applies a vacuum to media through a vacuum chamber cover, flattening the media as it is driven through the printing system to ensure that images are printed correctly on the media. The seals of the vacuum conveyor system can be used to close openings of the vacuum chamber cover that are not covered by the media, reducing vacuum leakage. Various embodiments described herein reduce cost, complexity, and number of actuators required to implement two-dimensional segmentation of the vacuum chamber cover. For example, a typical two-dimensional array of actuators (i.e., across the length and width of the vacuum chamber) that can regulate both the active length and width of the vacuum table area is costly to build and complex to control due to the required number of actuators. To alleviate these defects, it is advantageous to have a system that does not require one actuator per addressable region.

FIG. 1 is a block diagram illustrating components of an example printing system 100. The example printing system 100 has a conveyor system 110 for transporting media 115 in relation to one or more print bars 120 (e.g., print bars 120A, 120B, and 120C). The conveyor system 110 can include a driving belt 112 and a pair of rollers 114. The rollers are rotatably mounted on axles (not shown in FIG. 1). One or both rollers 114 can be powered by a drive mechanism 130 to drive movement of the driving belt 112. Specifically, the drive mechanism 130 can controllably rotate a roller 114, such as the roller 114B, to produce movement of the driving belt 112 and thereby move the media 115. In some embodiments, the conveyor system 110 transports the media 115 unidirectionally through the printing system 100, for example moving the media 115 only in a direction 119. As shown in FIG. 1, the media 115 can be segmented into working pieces that may be separated by a gap.

Each of the print bars 120 includes one or more print heads 122. In some embodiments, the print bars 120 are fixedly locked with respect to other components of the printing system 100, while the print heads 122 are movable with respect to the print bars 120. As the media 115 is transported in relation to the print bars 120, the print heads 122 deposit ink 117 on the media 115. The ink 117 can be deposited according to any text, images, patterns, or other specified data, and the media can include any substrate including, for example, paper, film, cardboard, tile, or cloth.

A controller 140 controllably powers components of the printing system 100, such as the print bars 120 and drive mechanism 130. The controller 140 can include one or more processors 142 and a storage device 144 (such as memory). In some embodiments, the controller 140 is configured to control any movements and operations in the printing system 100, such as movement of the driving belt 112 through the drive mechanism 130, feeding of media 115 through a feed system (not shown), or the coordinated operations of the printheads 122.

An encoder 160 measures movement of the media 115 through the printing system 100 and generates a signal such as to provide accurate controlled movement of the transfer belt 112 through the drive mechanism 130. In some embodiments, the encoder 160 provides feedback to the controller 140 to control the drive mechanism 130, the feed system, or the printheads 122 based on the signal output by the encoder 160.

In some embodiments, to print content onto the media 115, the controller 140 receives a print job (e.g., a tagged image file format (TIFF) file). The controller 140 may then produce a raster image that can be divided into separations that are sent to the print bars 120. Based on the separations, a controller or slave computer of each print bar 120 can control its respective print head 122 to print respective colors or other coatings on the media 115.

As shown in FIG. 1, a display 146 and a user interface 148 can also be communicatively coupled to and controlled by the controller 140. The display 146 and user interface 148, which in some embodiments can be incorporated into a common device (such as a touchscreen interface) provides information to a user of the printing system 100 and/or receives input from the user. Furthermore, the controller 140 can be coupled to one or more external devices via a communications link 150, which allows the controller 140 to transmit output signals to or receive input signals from the external devices. In some embodiments, the communications link 150 can be a cable or connector physically coupling the controller 140 to an external device. In other embodiments, the communications link 150 can be a transceiver configured to wirelessly transmit data to and/or receive data from an external device.

The controller 140 may be configured, such as through the one or more processors 142, to provide integral printer management capabilities, and/or to optimize the printer's capabilities across its options. The controller 140 and processors 142 may be remotely updatable, such as through the communications link 150, which enables a user to handle all the elements quickly and intuitively.

The printing system 100 further includes a vacuum source 170 that applies a vacuum to a vacuum chamber 172. A vacuum chamber cover 174 covers the vacuum chamber 172, such that the vacuum chamber 172 can apply a vacuum to a bottom side of the vacuum chamber cover 174. The vacuum source 170 may apply a continuous vacuum to the vacuum chamber 172 while the printing system 100 is operated, for example maintaining a pressure in the vacuum chamber 172 below a specified threshold. Alternatively, the vacuum source 170 may apply a vacuum only at specified times, or may increase or decrease the pressure in the vacuum chamber 172 based on needs of the printing system 100. The vacuum chamber cover 174 has a plurality of openings allowing airflow to the interior of the vacuum chamber 172 from a top surface of the vacuum chamber cover 174. The aperture of each of the openings is regulated by seals that can be actuated to open or close a respective region. By closing or opening the openings, the seals dynamically change the area of the vacuum table over which vacuum is applied. Thus, the vacuum area can be changed for varying-sized pieces of media to improve efficiency of the vacuum system. The vacuum source 170, vacuum chamber 172, and vacuum chamber cover 174, collectively referred to herein as a vacuum conveyor system, are described further with respect to FIGS. 2A-4B.

In some embodiments, the printing system 100 can include additional features, such as any of a tone adjustment system (TAS), calculated linearization capabilities, and/or calculated ink consumption capabilities. The TAS may be based on an intuitive interface, such as through display 146, which guides a user through the process of study and application of changes in tone or intensity, to apply to a model. This feature enables adjustments or variations on existing models in the illustrative printing system 100, without use of external additional software or extensive knowledge in color management.

In some embodiments, the electronic design of the printing system 100 can be based on a modular distribution of components, thus facilitating future upgrades and allowing full accessibility. Furthermore, in some embodiments, the electronic system of the printing system 100 can deliver high performance by using the controller 140 to upload image files (print jobs) and slave computers in the print bars 120 to manage the printing of image files. The result is increased graphical variability and nonstop manufacturing. The enhanced electronics design makes it possible to choose from various printing options and simultaneously use different printheads 122 in the same printing system. For example, some printheads 122 can be used to jet graphic designs onto the media 115, while others apply an undercoating, a primer, an overcoating, or an effect.

Figure 2A:
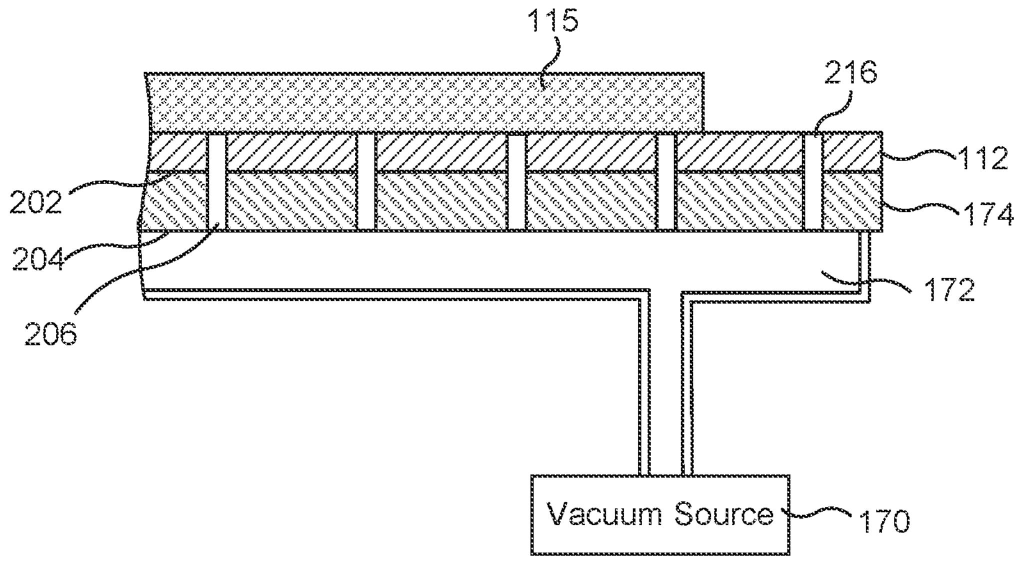
FIGS. 2A-2C are schematic diagrams illustrating one embodiment of the vacuum chamber cover.
Figure 2B:
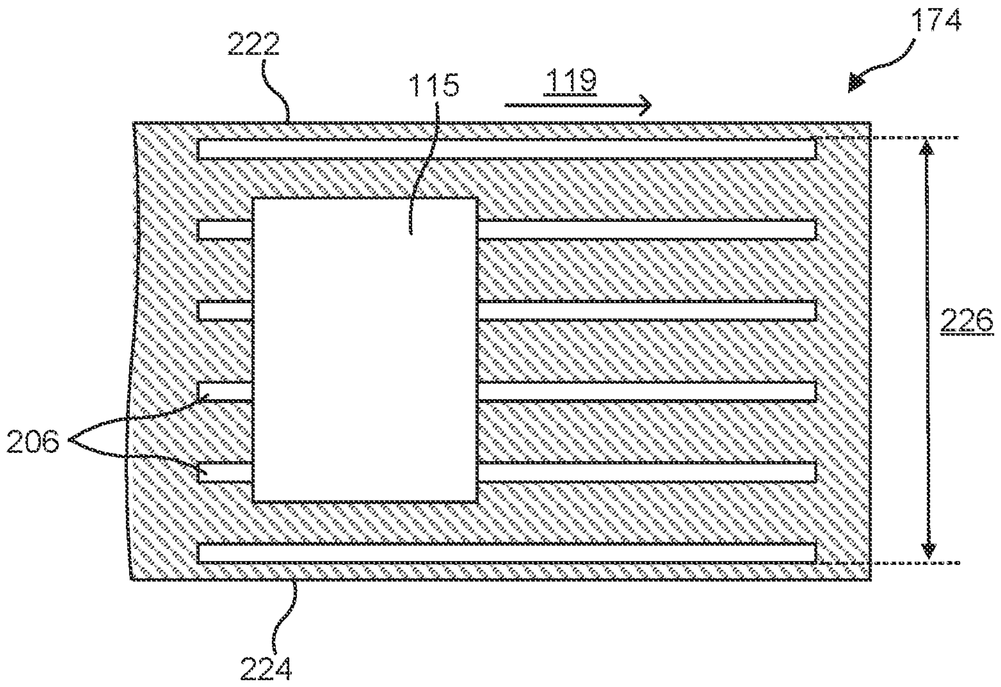
Figure 2C:
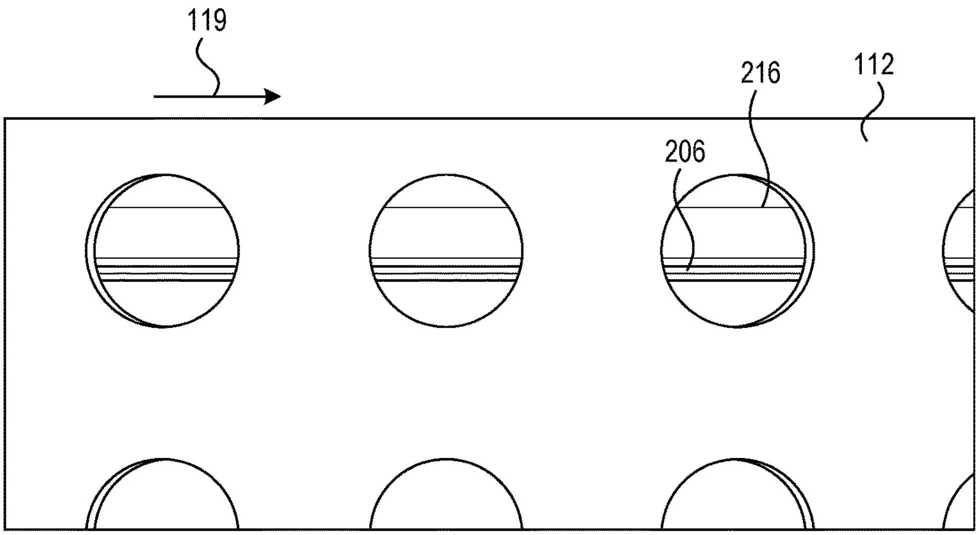

FIGS. 2A-2C are schematic diagrams illustrating one embodiment of components of a vacuum conveyor system where the vacuum chamber cover openings are longitudinal slots. FIG. 2A is a cross-sectional end view of the vacuum chamber 172 and vacuum chamber cover 174, while FIG. 2B is a top view of the vacuum chamber cover 174. As shown in FIGS. 2A-2B, the vacuum chamber cover 174 has a first surface 202 and a second surface 204 opposite the first surface 202. A plurality of slots 206 extend through the vacuum chamber cover 174 from the first surface 202 to the second surface 204. The slots 206 can be distributed in longitudinal rows spaced transversely across the vacuum chamber cover 174 to cover a working area of the vacuum chamber cover 174. For example, FIG. 2B shows that the vacuum chamber cover 174 can have a first lateral side 222 and a second lateral side 224, where the sides 222, 224 are parallel to the direction of travel 119 of the media 115 as the media is driven through the printing system 100. The slots 206 can similarly have a longitudinal direction that is substantially parallel to the first and second lateral sides 222, 224. The slots 206 can cover a substantial portion of a width from the first lateral side 222 to the second lateral side 224. A width 226 of the area covered by the slots 206 can define the width of the working area of the printing system 100, which is the area in which media can be fed through the system. For example, the width 226 of the area covered by the slots 206 may define a maximum width of media that can be fed through the printing system.

The driving belt 112 can contact the first surface 202 of the vacuum chamber cover 174. As shown in FIG. 2A, the driving belt 112 can include apertures 216. The apertures 216 can be substantially aligned with the slots 206 so as to allow airflow from a top surface of the driving belt 112 to the vacuum chamber 172. FIG. 2C shows a top view of a portion of the driving belt 112, showing that a longitudinal row of apertures 216 can be substantially colinear with a slot 206. Although the apertures 216 shown in FIG. 2C are circular, the apertures in the driving belt 112 may take any of a variety of shapes such as rectangular or elliptical. Furthermore, the row of apertures 216 need not be colinear with a slot 206; the apertures 216 may have any alignment with respect to the slots 206 that allows air to flow from the top surface of the driving belt 112 to the vacuum chamber 172. Thus, for example, a row of apertures 216 may not be centered over a slot 206 as shown in FIG. 2C. Based on the alignment of the driving belt apertures 216 and the vacuum chamber cover slots 206, a vacuum can be applied by the vacuum chamber 172 to the media 115 to ensure flattening of the media on the driving belt 112.

Figure 3:
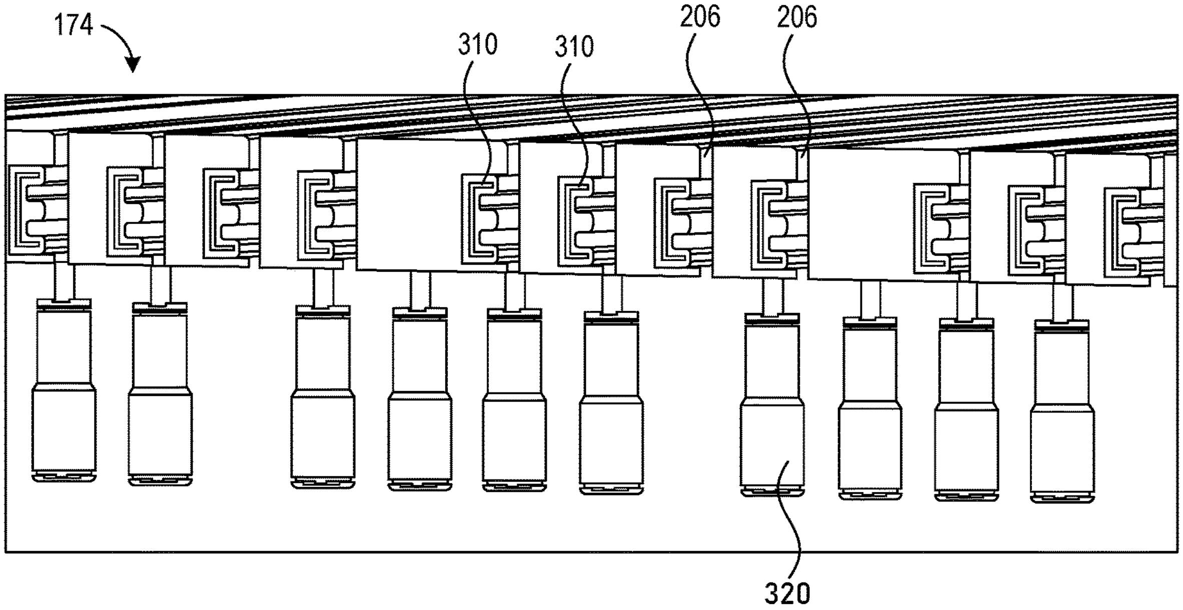
FIG. 3 is a schematic diagram illustrating a cross-sectional end view of a vacuum chamber cover.

Each opening 206 of the vacuum chamber cover 174 can be opened or closed by a seal disposed in the cover. FIG. 3 is a schematic diagram illustrating a cross-sectional end view of the openings 206 with associated seals 310. Each opening 206 can have a seal 310, and the seal 310 may extend a full length of its respective opening 206. Each seal 310 is drivable by an actuator to close and open the corresponding opening 206. The seals 310 when closed can form an airtight seal that prevents airflow through the corresponding opening. When the seals 310 are open, air flows through the openings 206 to induce vacuum within the vacuum chamber 172.

The seals 310 can be independently actuated. In some embodiments, the seals 310 are actuated by pneumatic actuators 320 that employ pressurized gas from a pressurized gas source. The supply or release of pressurized gas causes the seal 310 to respectively expand or contract. A valve placed upstream of the seal 310 can be used to regulate the flow of gas into or out of the seal 310. Although air is the most common gas for this purpose, any gas may be used to actuate the seals 310. Each seal 310 can be independently actuated, allowing airflow through each opening 206 to be regulated independently of the airflow through other openings. Each seal 310 can include an enclosed cavity that can be filled or emptied. Each cavity can be pneumatically isolated from the cavities of other seals, for example to prevent pneumatic communication between the seals 310.

Pneumatic actuation can be simpler than other types of actuation because the openings 206 can be regulated using only an airtight seal, a valve for controlling expansion and retraction of the seals, and a supply of pressurized air. Furthermore, the seals are more robust to contamination and degradation than actuation methods that rely on relative sliding between components because the pneumatic actuation acts perpendicular to the faces of the seals 310. However, in other embodiments, the seals 310 can be actuated to open or close the openings 206 by any of a variety of other types of actuators, such as piezoelectric actuators or servomotors.

The seals 310 can be actuated by a controller, such as the controller 140. The seals 310 can be actuated according to a width of the media 115 passing through the printer. If a given seal 310 is outside an area covered by the media 115 during the printing process, the seal can be actuated to close the corresponding opening 206. In some embodiments, the seals 310 can be actuated based on an input received from an operator of the printer. In other embodiments, the seals 310 are automatically actuated. For example, the controller 140 can receive a measurement of the width of the media 115 from the user of the printer or from a sensor, such as one or more optical sensors, and select a number of seals 310 to close such that the active width of the vacuum table area is approximately equal to the width of the media 115. As another example, a flow sensor can be positioned below each opening 206 and coupled to the controller 140. If the controller 140 detects, based on the flow sensors, that an opening is not covered by the media 115 (e.g., by detecting that the flow through the opening is greater than a specified threshold), the controller 140 can actuate the seal 310 corresponding to the opening in order to close the opening. In still another example, one or more optical sensors configured to detect a positioning of the media 115 are coupled to the controller 140. The controller 140 determines an area of the vacuum table that is covered by the media 115 and closes any seals 310 corresponding to openings positioned outside the covered area. The optical sensors can include, for example, a light source (such as an LED) positioned in an opening 206 and a photoelectric sensor above the vacuum chamber cover 174. The photoelectric sensor outputs a first signal if the sensor detects light from the LED and a second signal if the sensor does not detect the light from the LED. If the controller 140 determines that the photoelectric sensor is outputting the first signal, the corresponding opening is not covered by the media 115 and should therefore be closed. Other types of optical sensors can be used to detect the position of the media 115 instead of the photoelectric sensor.

Figure 4A:
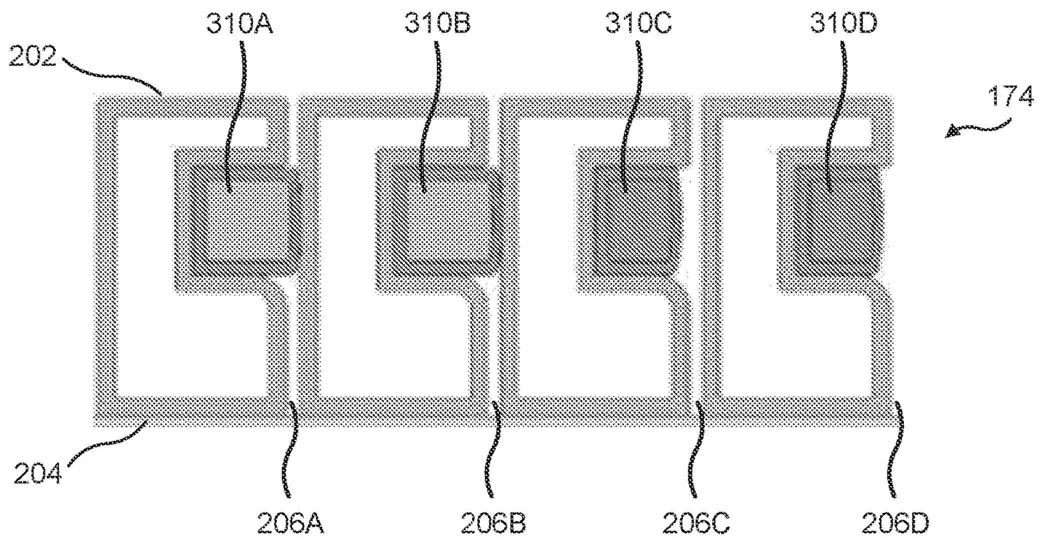
FIGS. 4A-4B illustrate various actuation methods for seals in a vacuum chamber cover.
Figure 4B:
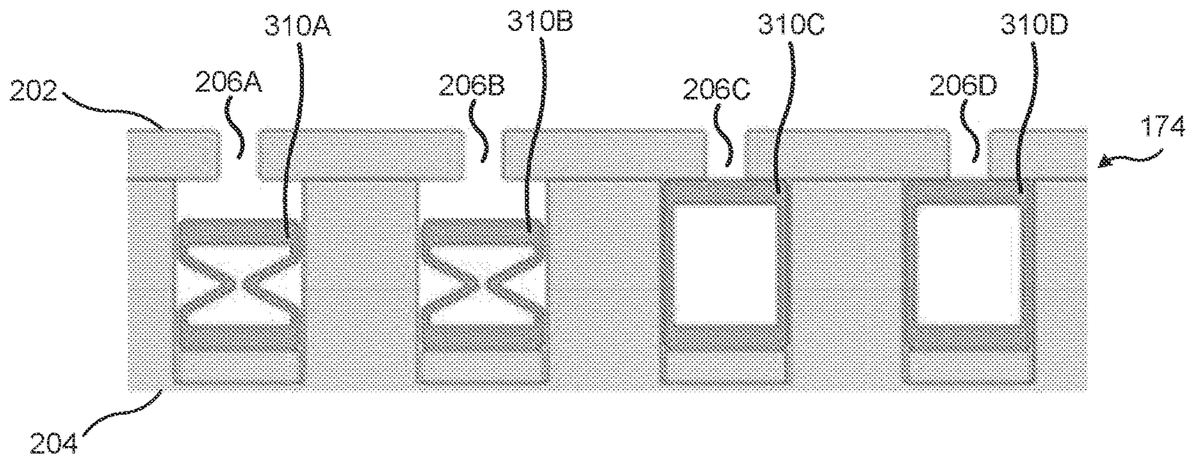

FIGS. 4A-4B illustrate various actuation methods for the seals 310. As shown in FIG. 4A, the seals 310 in some embodiments are housed within the vacuum chamber cover 174 and are configured to expand or contract along a horizontal plane of the cover 174 (i.e., in a direction substantially parallel to the first surface 202 and second surface 204 of the cover 174). In the example configuration shown in FIG. 4A, the seals 310A and 310B have been expanded to close corresponding openings 206A and 206B. The seals 310C and 310D are contracted, leaving corresponding openings 206C and 206D open to allow a vacuum to be applied through the openings 206C and 206D.

FIG. 4B shows that the seals 310 can be actuated vertically in other embodiments (i.e., towards or away from the first surface 202 or second surface 204). In the example configuration shown in FIG. 4B, the seals 310A and 310B are in a collapsed configuration that allows air to flow through the corresponding openings 206A, 206B. The seals 310C and 310D are expanded to close the openings 206C and 206D, preventing airflow through the openings 206C, 206D.

From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:

1. A printing system, comprising:

a driving belt configured to drive media through the printing system relative to one or more print heads; and a vacuum conveyor system, including:

a vacuum chamber cover having:

an active area with a length and a width;

a first surface;

a second surface opposite the first surface; and a plurality of slots each extending longitudinally across the length of the active area of the vacuum chamber cover, each slot forming an opening through the vacuum chamber cover from the first surface to the second surface;

for each respective slot of the plurality of slots, a seal disposed within and extending along a length of the respective slot of the plurality of slots, the seal drivable by an actuator to open or close the respective slot;

a controller configured to detect a width of the media and determine, based on the width of the media, one or more of the slots that are outside an area covered by the media, wherein the controller actuates the seals corresponding to the one or more determined slots to close the one or more determined slots; and a vacuum chamber below the second surface of the vacuum chamber cover and configured to apply vacuum to the media through one or more openings to constrain the media on the driving belt by flattening the media against the driving belt.

2. The printing system of claim 1, wherein the driving belt includes one or more apertures aligned with each of the plurality of slots.

3. The printing system of claim 1, further comprising a plurality of seals, wherein each seal of the plurality of seals corresponds to one of the slots in the plurality of slots and is drivable by an associated actuator to open or close the corresponding slot.

4. The printing system of claim 3, wherein each seal of the plurality of seals is actuated independently of other seals in the vacuum conveyor system.

5. The printing system of claim 1, wherein the seal is actuated to expand or contract horizontally in a plane of the vacuum chamber cover.

6. The printing system of claim 1, wherein the seal is actuated vertically towards or away from the first surface of the vacuum chamber cover.

7. The printing system of claim 1, wherein each seal comprises a cavity that is pneumatically isolated from cavities of other seals in the vacuum conveyor system.

8. The printing system of claim 1, wherein the driving belt drives the media in a driving direction relative to the print heads, and wherein the plurality of slots are distributed in parallel to the driving direction.

9. The printing system of claim 1, wherein the driving belt drives the media over the first surface of the vacuum chamber cover.

10. A printing system, comprising:

a vacuum chamber cover having:

an active area with a length and a width;

a first surface;

a second surface opposite the first surface; and a plurality of slots each extending longitudinally across the length of the active area of the vacuum chamber cover, each slot forming an opening through the vacuum chamber cover from the first surface to the second surface;

for each respective slot of the plurality of slots, a seal disposed within and extending along a length of the respective slot of the plurality of slots, the seal drivable by an actuator to open or close the respective slot;

a controller configured to detect a width of media on the active area and determine, based on the width of the media, one or more of the slots that are outside an area covered by the media, wherein the controller actuates the seals corresponding to the one or more determined slots to close the one or more determined slots; and a vacuum chamber below the second surface of the vacuum chamber cover and configured to apply vacuum to media through one or more open openings to constrain the media relative to the first surface.

11. The printing system of claim 10, further comprising a driving belt including one or more apertures aligned with each of the plurality of slots, wherein the driving belt supports the media and drives the media across the first surface of the vacuum chamber cover.

12. The printing system of claim 11, wherein the driving belt drives the media in a direction parallel to at least one of the slots.

13. The printing system of claim 11, further comprising one or print heads configured to print an image on the media as the media is driven by the driving belt.

14. The printing system of claim 10, wherein the seal is actuated to expand or contract horizontally in a plane of the vacuum chamber cover.

15. The printing system of claim 10, wherein the seal is actuated vertically towards or away from the first surface of the vacuum chamber cover.

16. The printing system of claim 10, wherein the actuation of the seal is based on a supply of pressurized gas.

17. The printing system of claim 10, wherein each seal is actuated independently of other seals in the printing system.

* * * * *